Dec. 27, 1927.
G. W. CAREY
1,653,760
CRUST BREAKER
Filed March 10, 1927
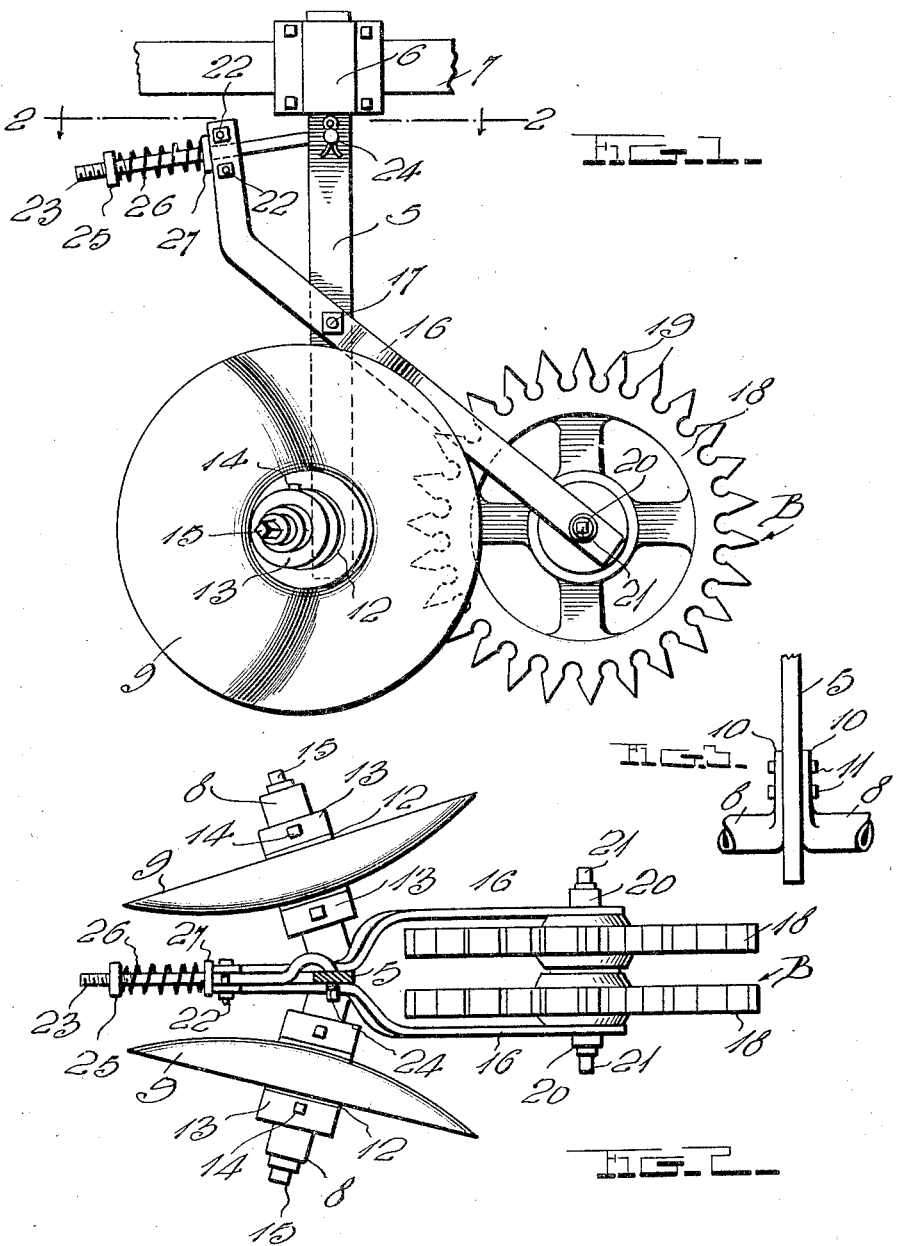
Inventor
G. W. Carey
Witness
H. Woodard Patented Dec. 27, 1927.

1,653,760

UNITED STATES PATENT OFFICE.

GEORGE W. CAREY, OF OSHKOSH, NEBRASKA.

CRUST BREAKER.

Application filed March 10, 1927. Serial No. 174,254.

The invention has reference to agricultural implements and more particularly to a crust breaker which is preferably embodied in a beet or analogous cultivator, for the purpose of breaking the crust directly over a row of sprouting seed, while cultivation along and between the rows is being effected.

The present invention is somewhat analogous to the subject matter of my U. S. Patent No. 1,454,724 of May 8, 1923, but the object of the present application is to protect the improved features of construction, whereby the earth along opposite sides of the row may be more effectively worked and whereby the crust breaker may vertically move independently of the cultivating implement, according to irregularities in the surface along the row.

With the foregoing and minor objects in view, the invention resides in the novel subject matter hereinafter described and claimed, the description being supplemented by the accompanying drawing.

Fig. 1 is a side elevation illustrating the invention.

Fig. 2 is a plan view partly in horizontal section as indicated by line 2—2 of Fig. 1.

Fig. 3 is a fragmentary rear elevation showing the preferred manner of securing the disk-carrying, stub shafts to the standard.

In the drawing above briefly described, the numeral 5 denotes a standard which may be secured by a clamp or the like 6 to the frame 7 of a cultivator. The lower end of this standard is provided with stub shafts 8 carrying cultivating disks 9, the inner ends of said shafts preferably having integral, upstanding, attaching plates 10 which are secured to the standards 5, by bolts 11. Both shafts 8 are preferably hollow to contain a lubricant, and suitable openings (not shown) may be provided to permit escape of such lubricant into the hubs 12 of the disks 9, said hubs being confined between collars 13 which may be secured to the shafts 8, by bolts 14 or in any other desired manner. At 15, plugs have been shown for the outer ends of the hollow shafts 8, these plugs being removable to permit filling of said shafts with any desired lubricating material.

Two inclined levers 16, cross the intermediate portion of the standard 5 and are fulcrumed between their ends to said portion, by a bolt or the like 17. These levers are spaced apart throughout their lengths, the spacing at the lower portions being preferably greater than at the upper portions. A crust breaker B is rotatably mounted between the lower ends of the levers 16 and preferably consists of a pair of toothed, independently rotatable wheels 18, provided with peripheral teeth 19. The hubs of the wheels may well be mounted upon a hollow axle 20, which axle may contain lubricant and will of course be provided with openings to permit escape of such lubricant to the interior of said hubs. The ends of the axle 20 may be closed by plugs 21, either of which may be removed for replenishment of lubricant.

Vertically spaced bolts 22 connect the upper, spaced ends of the levers 16, and a rod 23 passes slidably between these bolts and between the contiguous portions of said levers, the inner end of this rod being suitably pivoted at 24 to the standard 5, while the outer end thereof is provided with a nut or other desired shoulder 25. A coiled, compression spring 26, surrounds the rod 23 between the shoulder 25 and the upper ends of the levers 16, and a washer 27 is preferably provided on said rod, between said spring and said levers.

The disks 9 are intended to straddle a row of sprouting beet seed or other seed to between the contiguous portions of said row, and at the same time, the crust breaker B travels directly upon the row, so pulverizing the crust that the sprouts may readily find their way therethrough. The spring 26 and associated parts, hold the crust breaker B firmly down against the earth but permit vertical yielding thereof according to any unevenness.

On account of existing advantages for the details disclosed, they are preferably followed. However, within the scope of the invention as claimed, variations may, of course, be made.

I claim:

1. In an earth worker, a standard, a crust breaker, an inclined lever crossing said standard and at its lower end carrying said crust breaker, means between the ends of the lever fulcruming the latter on the standard for vertical movement, and spring means connecting the upper end of the lever with the standard and serving with said lever to hold the crust breaker yieldably down against the ground.

2. In an earth worker, a standard, two inclined levers disposed one at each side of said standard and crossing the same, means fulcruming the intermediate portions of said levers to said standard, a rotatable crust breaker mounted between the lower ends of said levers, spaced members connecting the upper ends of said levers, a rod pivoted to said standard and passing slidably between said spaced members and between the contiguous portions of the levers, the outer end of said rod having a shoulder, and a coiled compression spring on said rod interposed between the shoulder and the levers, yieldably holding the latter to retain the crust breaker upon the ground.

In testimony whereof I have hereunto affixed my signature.

GEORGE W. CAREY.